(12) United States Patent
King et al.

(10) Patent No.: US 9,130,744 B1
(45) Date of Patent: Sep. 8, 2015

(54) SENDING AN ENCRYPTED KEY PAIR AND A SECRET SHARED BY TWO DEVICES TO A TRUSTED INTERMEDIARY

(71) Applicant: ENVELOPE, LLC, Wilmington, DE (US)

(72) Inventors: Kevin King, Silver Spring, MD (US); Brad Bergersen, Severn, MD (US)

(73) Assignee: Envelope, LLC, Wilmington, DE (US)

( * ) Notice: Subject to any disclaimer, the term of this patent is extended or adjusted under 35 U.S.C. 154(b) by 0 days.

(21) Appl. No.: 14/492,847

(22) Filed: Sep. 22, 2014

(51) Int. Cl.
*H04L 9/08* (2006.01)
*H04L 9/30* (2006.01)
*H04L 29/06* (2006.01)

(52) U.S. Cl.
CPC .............. *H04L 9/083* (2013.01); *H04L 9/0861* (2013.01); *H04L 9/30* (2013.01); *H04L 63/062* (2013.01); *H04L 2209/24* (2013.01)

(58) Field of Classification Search
CPC ......... H04L 9/083; H04L 9/0861; H04L 9/30; H04L 63/062; H04L 2209/24
USPC ............................ 380/282, 258, 255; 713/156
See application file for complete search history.

(56) References Cited

U.S. PATENT DOCUMENTS

| | | | |
|---|---|---|---|
| 5,241,599 A | 8/1993 | Bellovin et al. | |
| 5,440,635 A | 8/1995 | Bellovin et al. | |
| 7,055,027 B1* | 5/2006 | Gunter et al. | 713/151 |
| 7,181,017 B1* | 2/2007 | Nagel et al. | 380/282 |
| 8,566,247 B1* | 10/2013 | Nagel et al. | 705/59 |
| 8,719,952 B1* | 5/2014 | Damm-Goossens | 726/28 |
| 2005/0120199 A1* | 6/2005 | Carter | 713/150 |
| 2005/0172116 A1* | 8/2005 | Burch et al. | 713/155 |
| 2005/0204182 A1* | 9/2005 | Smith et al. | 714/4 |
| 2005/0229004 A1* | 10/2005 | Callaghan | 713/185 |
| 2005/0240779 A1* | 10/2005 | Aull et al. | 713/186 |
| 2006/0200527 A1* | 9/2006 | Woods | 709/206 |
| 2006/0200660 A1* | 9/2006 | Woods | 713/155 |
| 2008/0005024 A1* | 1/2008 | Kirkwood | 705/50 |
| 2008/0215894 A1* | 9/2008 | Van Gestel et al. | 713/189 |
| 2010/0228968 A1* | 9/2010 | Wason et al. | 713/156 |
| 2012/0084138 A1* | 4/2012 | Anantha et al. | 705/14.41 |
| 2012/0089450 A1* | 4/2012 | Anantha et al. | 705/14.23 |
| 2012/0099727 A1* | 4/2012 | Marshall et al. | 380/255 |
| 2012/0129493 A1* | 5/2012 | Vasudevan | 455/411 |

(Continued)

OTHER PUBLICATIONS

"Encrypted Key Exchange" downloaded from Wikipedia Apr. 3, 2014, https://en.wikipedia.org/wiki/Encrypted_key_exchange, 2 pages, U.S.A.

(Continued)

*Primary Examiner* — Haresh N Patel
(74) *Attorney, Agent, or Firm* — Radlo IP Law Group; Edward J. Radlo

(57) ABSTRACT

Key exchange methods, apparati, and computer-readable media for a cryptographic communication system. The system, which employs a novel combination of multiple channel communication, symmetric cryptography, and asymmetric cryptography, allows an entity A to bootstrap the exchange of cryptographic secrets $EQ_B$ to a second entity B through an alternate communication channel 30 for the transmission of a cryptographically secure message M. The system is secure against various passive and active attacks. The encryption key transfer is briefly vulnerable to man-in-the-middle attacks, but this can be prevented in preferred embodiments.

22 Claims, 2 Drawing Sheets

(56) References Cited

U.S. PATENT DOCUMENTS

2012/0143669 A1* 6/2012 Anantha et al. ............ 705/14.27
2012/0143758 A1* 6/2012 Anantha et al. ................ 705/44
2012/0144201 A1* 6/2012 Anantha et al. ............... 713/172
2012/0328101 A1* 12/2012 Lakshminarayanan ....... 380/258
2013/0232336 A1* 9/2013 Cheung et al. ................ 713/156
2014/0196079 A1* 7/2014 Jannard et al. .................. 725/31

OTHER PUBLICATIONS

"Password-authenticated key agreement" from Wikipedia, downloaded Apr. 3, 2014, https://en.wikipedia.org/wiki/Password-authenticated_key_agreement, 4 pages, U.S.A.

* cited by examiner

SENDING AN ENCRYPTED KEY PAIR AND A SECRET SHARED BY TWO DEVICES TO A TRUSTED INTERMEDIARY

TECHNICAL FIELD

This invention relates to cryptographic communications in general and, in particular, to methods and systems for establishing secure, authenticated, private communications between parties when the parties are not initially capable of performing communications over encrypted channels.

BACKGROUND ART

Parties often wish to communicate privately. This privacy can be obtained through the use of various cryptographic methods. These cryptographic communication methods rely on exchanging the necessary information to perform encryption in a trusted manner.

A basic knowledge of the terms used in cryptology is useful. A class of puzzles is called a "cryptographic system" or "cryptosystem." The process of making puzzles is called "encryption", and the process of solving those puzzles to recover the contents is called "decryption." The puzzle is called "ciphertext" and the contents of the puzzle is called "plaintext." The members participating in a cryptosystem are identified by one or more cryptographic keys or keys. Cryptosystems describe the scheme by which a key is used to transform plaintext into ciphertext; further, cryptosystems describe the scheme by which a key is used to reverse the previous transformation in order to recover the plaintext. Cryptosystems can be grouped into two distinct classifications, symmetric cryptosystems and asymmetric cryptosystems. In symmetric cryptosystems, the key used to transform the plaintext into ciphertext and the key used to transform the ciphertext into plaintext are identical. In asymmetric cryptosystems, a public key is used to transform the plaintext into ciphertext, and a distinct, but related, private key is used to transform the ciphertext into plaintext. A brute force attack is a computational method that attempts to discover a cryptographic key through repeatedly making guesses in order to decrypt a message. Forward Secrecy is the concept that the ability to decrypt one message does not give one the ability to decrypt any other messages.

Returning to the discussion of the exchange of cryptographic keys, in modern cryptography, an asymmetric cryptosystem is often used to secure the key of a symmetric cryptosystem for transport. The most common example of this kind of encryption scheme is Transport Layer Security (TLS). When a sender desires to communicate securely with a recipient, the sender requests the public key of the recipient from an Authoritative Third Party (e.g., a Certificate Authority). The sender then uses this public key to perform a TLS handshake with the intended recipient. Within this handshake, a limited use symmetric key is exchanged.

This kind of exchange is performed for three reasons. First, it helps protect the asymmetric key pair from brute force attacks. Second, asymmetric encryption is often computationally slower than symmetric encryption. Third, these messages exhibit Forward Secrecy. For unsolicited communications networks, however, this kind of key exchange can have serious disadvantages, because it requires the public keys of all capable recipients to be listed in a public repository. This listing can be misused by a malicious user to generate unwanted, possibly dangerous, messages. As a result, the adoption of this kind of key exchange for some messaging systems has been, to date, limited.

Encrypted communications also suffer from the classic "chicken-and-egg" problem. All parties to a communication must agree on a method to perform encrypted communication before such communication can begin. This problem is compounded by the fact that, in many cases, users are incapable of completing the steps necessary to perform encrypted communications reliably. Additionally, users often misplace their keys or forget the passwords to access their keys, which causes the encrypted messages to be lost forever. Finally, users now often use multiple devices to read electronic messages, and they are frustrated when they cannot read encrypted communications at a place and time of their choosing because the chosen device either does not support the encryption method or the device does not contain the required keys.

SUMMARY OF THE INVENTION

The present invention provides a mechanism for establishing private and authenticated communications between parties who share a secret, using an approach that differs from the prior art. The invention allows a single party to initiate encrypted communication without the need to negotiate encryption protocols before the transmission of the first encrypted message. Communications conducted pursuant to the present invention are easier than those initiated with existing key exchange protocols, because it is often the case that at least one party to the encrypted communication is technically incapable of successfully configuring their preferred communications client (software) to be able to receive and transmit encrypted communications. The present invention handles many of the configuration and setup details for the receiving party, facilitating the establishment of encrypted communications between the parties. This encryption key exchange system is intended to complement an existing point-to-point encrypted communication channel where messages may be stored in an unencrypted form at one or more points along the communication channel.

The results are obtained in an illustrative embodiment of the present invention in which one of the private key and public key pairs necessary for communication in a public key distribution system is encrypted using a shared secret and transmitted utilizing a communication channel separate from the message communication channel. The illustrative embodiment differs from Password Authenticated Key Exchange in the application of specific types of encryption methods at points in the exchange, utilizes different methods to perform the key exchange relative to the messages the key exchange is designed to protect, and does not require the receiving party to have any capability beyond the capability to receive encrypted messages.

This key exchange system is an alternative to the existing public key distribution system. Its primary focus is to ensure successful escalation of communications to an encrypted channel without many of the drawbacks of a public key distribution system.

BRIEF DESCRIPTION OF THE DRAWINGS

These and other more detailed and specific objects and features of the present invention are more fully disclosed in the following specification, reference being had to the accompanying drawings, in which.

DETAILED DESCRIPTION OF PREFERRED EMBODIMENTS

Glossary

X, Y: each of X and Y is a generic "item". Their meaning changes for each use in each definition.
A, B: the parties attempting to communicate (Alice and Bob, respectively).
L: an intermediary trusted by A.
P: a secret shared between A and B.
$P_X$: a secret shared between A and X.
P(X): the cyphertext generated using P of the plaintext X.
$P^{-1}(X)$: the plaintext generated using P of the cyphertext X.
Key: a value used to encrypt plaintext into cyphertext, or decrypt cyphertext into plaintext.
$E_X$: the public key of X. This is the key shared with other users in order to encrypt plaintext into cyphertext for X.
$Q_X$: the private key of X. This key is not shared with anyone, and is used to decrypt cyphertext transmitted to X.
$EQ_X$: the public/private key pair of X.
$E_X(Y)$: cyphertext generated by the use of a public key of X of plaintext Y.
$Q_X(E_X(Y))$: plaintext generated by the use of a private key of X of cyphertext $E_X(Y)$. $E_X$ and $Q_X$ must be part of the same public key/private key pair in order to perform this action.
Z: a random value generated to be used for key transmission.
M: a message to transmit.
R: a random value generated for use as a symmetric cryptographic puzzle's key. Its usage is similar to P.
$\Sigma_X(E_X(Y))$: a set of cyphertext generated by the use of a number of public keys X of plaintext Y. If three public keys A, B, and C were used, the long form equivalent expression would be $E_A(Y)+E_B(Y)+E_C(Y)$.
$H_X$: identity information for a recipient X.

Exemplary Embodiment

Figure 1:
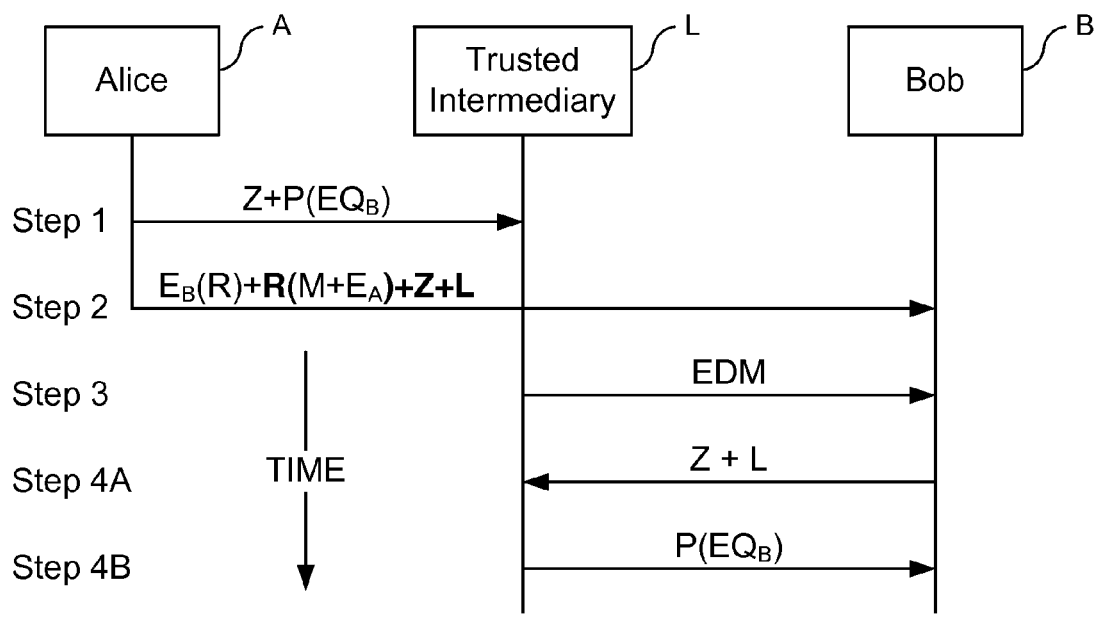
FIG. 1 is a timeline showing the sequence of messages used in an illustrative embodiment of the invention that utilizes multiple communications channels with both symmetric and asymmetric cryptosystems in order to transmit both the contents of an encrypted message and all of the tools necessary to decrypt the message and form an encrypted response.

The encryption keys exchanged in an illustrative embodiment of the present invention are shown in FIG. 1. The typical embodiment utilizes a symmetric encryption system enabled by a shared secret P. Alice (A) wishes to establish private and authenticated communications with Bob (B) over a communication channel. These messages are unlikely to be delivered and read instantaneously, but may rest at various points along the communication path, and may be conveyed by any number of public and/or private communications links, such as telephone links or wireless networks. In this embodiment, and in each embodiment in this Detailed Description of Preferred Embodiments section, Alice and Bob are deemed to have a priori knowledge of the shared secret P. Additionally, Alice is the initiating party and Bob is the responding party. Referring to FIG. 1:

Step 1. Alice generates a Public Key/Private Key Pair ($EQ_B$) which is a corresponding Public Key ($E_B$) and Private Key ($Q_B$) to be used by Bob, and encrypts $EQ_B$, or a portion thereof, in a symmetric cryptosystem illustratively of the type described in Data Encryption Standard, Federal Information Processing Standards Publication 46, National Bureau of Standards, U.S. Department of Commerce, January 1977, with password P as the key yielding $P(EQ_B)$. Additionally, Alice generates a random value (Z) and attaches it to $P(EQ_B)$. This forms a message $Z+P(EQ_B)$. Alice transmits the message $Z+P(EQ_B)$ to the Trusted Intermediary (L).

Step 2. Alice encrypts the Message Contents (M) and Alice's own public key ($E_A$) with a random symmetric key (R) to create $R(M+E_A)$. Alice encrypts R with $E_B$ to create $E_B(R)$ and appends $E_B(R)$ to $R(M+E_A)$ to create $E_B(R)+R(M+E_A)$. Alice appends Z and L to $E_B(R)+R(M+E_A)$ to create $E_B(R)+R(M+E_A)+Z+L$. Alice transmits $E_B(R)+R(M+E_A)+Z+L$ to Bob.

Step 3. Bob contacts the Trusted Intermediary L and retrieves a method to perform encryption and decryption (EDM) of $E_B(R)+R(M+E_A)$.

Step 4. Using the information of Z and L in $E_B(R)+R(M+E_A)+Z+L$, Bob retrieves $P(EQ_B)$ from the Trusted Intermediary L. Bob, knowing P, decrypts $P(EQ_B)$ to obtain $P^{-1}(P(EQ_B))=EQ_B$. Bob, utilizing EDM, uses $Q_B$ (his new private key) to decrypt $E_B(R)$ to obtain $Q_B(E_B(R))=R$. Finally, Bob, utilizing EDM, uses R to decrypt $R(M+E_A)$ to obtain $R^{-1}(R(M+E_A))=M+E_A$. Bob now has the plaintext message M as well as Alice's public key $E_A$. Bob reads M. Thereafter, Alice and Bob may use R, or numbers derived from R, as session keys to conduct confidential communications. Alternatively, Alice and Bob may use $E_B$ and $E_A$, respectively, using asymmetric cryptography, to securely transmit new values replacing R as session keys to be used for further confidential communications.

Validation Techniques

The embodiment outlined in the above example may have a number of potential issues that might allow an attacker to recover the transmitted Public Key/Private Key pair $EQ_B$. Additionally, the nature of the exchange potentially makes it vulnerable to various kinds of attacks.

Guarding Against Replay and Queue Jumping Attacks

The illustrative embodiment outlined in the above example may not be suitable for all encryption applications, because any acquisition of messages that contain Z and L (as in Step 2) could be replayed against L in order to retrieve the encrypted Public Key/Private Key Pair $EQ_B$ stored by Z.

Thus, it is important for any implementation of the invention to allow only a single recovery of the encrypted Public Key/Private Key Pair $EQ_B$ stored in Z. In other words, Z should be a one-time key. This (1) forces all replays of an otherwise valid Z to be invalid, and (2) allows the users of the exchange system to detect queue jumping attacks.

Man-in-the-Middle Attacks

Of particular concern in any cryptosystem are Man-in-the-Middle attacks. This key exchange system relies on standard point-to-point security (e.g., Transport Layer Security) between all pairs of communication nodes in order to be successful. If an attacker successfully inserts himself in the exchange of the initial message $E_B(R)+R(M+E_A)+Z+L$, the attacker could modify L to point to an untrusted location, which could serve up malicious versions of EDM, in addition to possibly changing the message exchange protocol, to cause Bob to surrender P unwittingly.

Recall that Bob may have no knowledge of encryption and decryption. Thus, Bob must take any and all messages at face value since he, even if he has knowledge of encryption, has no easy way of verifying whether or not messages or the communication channel have been compromised. An existing, persistent, compromised communications channel could take advantage of this, and modify any message leaving Alice or arriving to Bob.

If Alice is concerned that either Alice's or Bob's communication channel is compromised, Alice should use an out of band method to communicate the necessary steps for Bob to acquire EDM from L. With a known, good EDM, Bob has the capability to avoid a Man-in-the-Middle attack on the key exchange despite a successful Man-in-the-Middle attack on the message exchange. For many users, the convenience of transmitting the location of EDM over an unencrypted channel in tandem with the first encrypted message is an acceptable risk, given the existing trust in the communications channel.

Confidentiality

Bob should not consider the keys provided by Alice to be capable of confidentiality beyond communications with Alice. In particular, Bob should not use his new public key $E_B$ that was provided by Alice in communications that do not involve Alice; doing so would present the risk that such messages would not be confidential between the parties involved. Bob may improve his confidentiality by generating a new public/private key pair for himself, and instructing Alice to use his new public key in subsequent communications, after providing her with his new public key. This new public/private key pair may then be used by Bob for communications with others besides Alice.

Key Revocation

Encryption keys should be revocable when it is discovered they are compromised or they can no longer be used (such as when the password to the private key is lost); the trusted intermediary L may be used as the authoritative host for revocation information, depending on the level of trust the user has with the trusted intermediary L. The trusted intermediary L for this information should be declared in advance such that it would be impractical for a malicious entity to use revocation as a method to inject a compromised encryption key into a conversation. It is important that any keys provided or acquired following a key revocation be viewed with extreme prejudice.

Users should confer out of the communication band following a key revocation before resuming encrypted communications, to ensure that any new encryption keys are secure.

Communicating with Multiple Recipients

Initiating encrypted communications among multiple parties is also possible using techniques described herein. One method to accomplish this task comprises A appending multiple $P_X(EQ_X)$, where X represents a unique recipient, to Z, and A transmitting the resulting $Z+\Sigma_X(P_X(EQ_X))$ to the trusted intermediary L. The number of times the set of $\Sigma_X(P_X(EQ_X))$ can be retrieved is equal to the number of encrypted key sets available. Each X then uses Z to retrieve its $\Sigma_X(P_X(EQ_X))$, and decrypts its own $P_X(EQ_X)$ using its own shared secret.

Alternatively, A creates a unique $Z_X$ for each recipient X, derived from the master value Z and from some identifiable information $H_X$ related to X (e.g., an email address). A sends the collection $\Sigma_X(Z_X+P_X(EQ_X))$ to the trusted intermediary L. Each X then, separately, derives its unique $Z_X$ from the master random value Z and from the same identifiable information $H_X$ associated with that particular X. Each X then sends its $Z_X$ to the trusted intermediary to retrieve X's unique $P_X(EQ_X)$. This technique allows $Z_X$ to be single use, preserving protections against Replay Attacks.

In both embodiments described above, the symmetric encryption key R is encrypted separately with each unique $E_X$ for each recipient X. The resulting $\Sigma_X(E_X(R))+R(M+E_A)+Z+L)$ is transmitted to each recipient X.

Key Management for Alice

In exemplary embodiments, Alice can maintain the ability to read messages A has sent to Bob by retaining a copy of Bob's Private Key, $Q_B$. Alternatively, in Step 2 Alice can encrypt the symmetric key R with her own Public Key $E_A$ to produce $E_A(R)$. She can then append $E_A(R)$ to the message M in the same way that $E_B(R)$ is appended to the message M. This reduces the number of keys B needs to maintain in order to retain access to encrypted communications.

Illustrative Embodiments that Benefit from Out-of-Band Key Exchange

Illustrated embodiments of this invention use a message encryption scheme similar to Pretty Good Privacy (PGP). However, the particular message encryption system is not of particular consequence, except that the encryption scheme should be based on asymmetric cryptography.

An Overview of PGP

PGP is defined in the Internet Engineering Task Force (IETF) Requests for Comments (RFCs) 1991, 2440, 4880, and 5581. PGP has technical definitions to assist in the digital signing, encryption, and compression of messages. The process of utilizing these features is often as follows:
1. A sender creates a Message M.
2. A sender generates a session key R to be used for this Message M only.
3. A sender generates a Hash Code H of the Message M and encrypts it with their private key Q to create a digital signature S, and appends S to the Message M.
4. The sender encrypts R with each recipient's public key E.
5. The sender compresses the Message MS to form C(MS).
6. The sender encrypts the Message C(MS) with R to form R(C(MS)).
7. The sender appends the Message R(C(MS)) to the set of public keys associated with the recipients.
8. The sender transmits the composite encrypted Message and encrypted key set to the recipients.
9. The recipients each use their private key to decrypt the session key R.
10. The recipients each use the session key R to decrypt and read the message M.
11. The recipients each use the public key of the sender (which they obtain from the Trusted Intermediary L) to verify the Hash Code H of the message to determine authenticity of M.

In these kinds of exchanges, session keys are assumed to be encryption keys for a symmetric key cryptosystem. Private and Public keys are assumed to be encryption keys for an asymmetric key cryptosystem.

The IETF's definition of PGP currently specifies that a number of symmetric key cryptosystems are compatible with PGP, including IDEA, TripleDES, CAST5, Blowfish, AES, and Twofish. The IETF's definition of PGP currently specifies that a number of asymmetric cryptosystems are compatible with PGP, including RSA, El Gamal, DSA, ECDSA, Diffie-Hellman, and Elliptic Curve.

Selecting a Symmetric Key Cryptosystem

Symmetric Key encryption is used in various embodiments of the present invention to encrypt the asymmetric key transfer, and to protect all messages of consequence. In general, the same symmetric key cryptosystem can be used in all cases.

The original plaintext of the message M should not contain any non-random padding to match the encryption blocksize. Deterministic padding reduces the effectiveness of symmetric cryptosystems. Additionally, error correction should not be used, since lower level communications protocols themselves often contain such error correcting codes.

Selecting an Asymmetric Key Cryptosystem

Asymmetric Key encryption is used in various embodiments of the present invention, to encrypt the message M and to encrypt Alice's Public Key.

Any asymmetric key cryptosystem that utilizes public and private key pairs can be used, including but not limited to RSA, El Gamal, and Elliptic Curve.

When Alice generates the asymmetric key pair for Bob, care should be taken that the random number generator that generates Z and R is not seeded improperly. Improper seeding can make the potential knowledge of either Bob's or Alice's private key compromise the security of the other party's private key.

Apparatus to Carry Out the Key Exchange

An illustrated embodiment of an apparatus that can carry out the key exchange described above is shown in FIG. 2. This embodiment can be easily modified by a person having ordinary skill in the art to perform alternative embodiments of the invention. For example, Alice can have just one symmetric encryptor rather than two, and Bob can have just one symmetric decryptor rather than two.

Alice A and Bob B are two persons, computers, processing stations, communications stations, or other standard equipment, who share a secret P. Alice comprises two adders 28, 29, an asymmetric encryption key pair generator 21, a random number generator 24, a symmetric encryption key generator 22, two symmetric encryptors 23, 26, an asymmetric encryptor 25, and a memory 27 for storing the message M and Alice's public key $E_A$.

Bob comprises an extractor 42 capable of recognizing a random number, two symmetric decryptors 41, 44, an asymmetric decryptor 43, and a memory 45 for storing the message M. Additionally, Bob contains a processor 46 capable of receiving and implementing the encryption and decryption methods provided by the Trusted Intermediary L. The Trusted Intermediary L comprises temporary storage 31, more permanent storage 32 for storing encryption/decryption algorithms, and transmitters and receivers (not shown) for communicating with Alice and Bob.

In operation, Alice's asymmetric encryption key pair generator 21 creates a key pair $EQ_B$ that will be used by Bob. Symmetric encryptor 23 encrypts the key pair $EQ_B$ with P. A random number Z is generated by generator 24 and is attached to the key pair $EQ_B$ by adder 28. The resulting composite message $Z+P(EQ_B)$ is transmitted to the Trusted Intermediary L by a transmitter (not shown). The Trusted Intermediary L receives this information and places it in its temporary storage 31.

Alice's symmetric encryption key generator 22 then generates a session key R. The session key R is used to encrypt the combination {Alice's public key+the message M} using information from memory 27 and encryptor 26. Alice uses Bob's public key $E_B$ to encrypt the session key R using encryptor 25. The encrypted session key and encrypted {message+Alice's public key} are combined in adder 29 with the random number Z previously generated, along with information needed by Bob to locate the Trusted Intermediary L. This composite message is then transmitted to Bob through communications channel 30, by a transmitter within Alice that is not illustrated.

Bob receives this composite message, and uses extractor 42 to extract the random number Z and the information for contacting the Trusted Intermediary L. Bob contacts the Trusted Intermediary L and, by providing L with the random number Z, receives from L the encrypted public private key pair $P(EQ_B)$ and a method (e.g., a cryptographic algorithm) that has been stored in memory 32 that enables Bob to decrypt the key pair, using processor 46. Bob then uses the shared secret P to decrypt the asymmetric encryption key pair $EQ_B$ using decryptor 41. Bob then uses the private key $Q_B$ of the asymmetric key pair $EQ_B$ and decryptor 43 to decrypt the session key R that was used in the composite message. Bob then uses the decrypted symmetric key R and decryptor 44 to decrypt the encrypted {message M+Alice's public key $E_A$}. Bob reads the message M, and stores Alice's public key $E_A$ for later use in any reply that Bob wishes to send back to Alice.

Following retrieval of the asymmetric key pair $EQ_B$ by Bob, the Trusted Intermediary L discards the encrypted asymmetric encryption key pair $EQ_B$, consistent with the principle referred to above.

Figure 2:
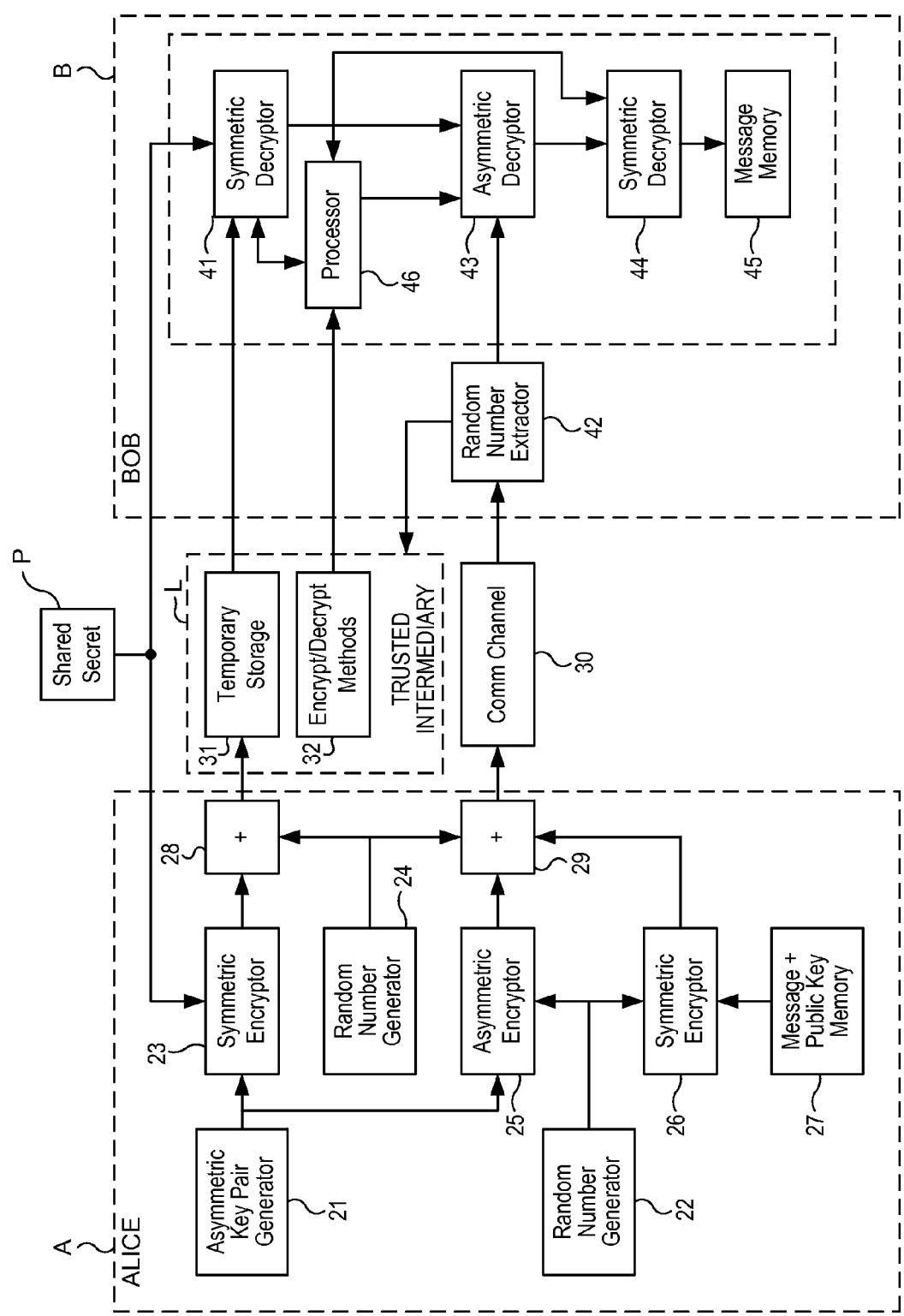
FIG. 2 is a block diagram of an apparatus of an embodiment of the present invention that utilizes a trusted intermediary L, asymmetric cryptosystems, and symmetric cryptosystems to enable a sender A to provide a recipient B with the capability to participate in an encrypted communication with the sender A.

The modules shown in FIG. 2 can be implemented in any combination of hardware, firmware, or software. When implemented in software, the modules can reside on one or more non-transitory computer-readable media, including but not limited to hard disks, optical disks, flash memories, etc.

At this point, both Alice and Bob possess sufficient knowledge to participate in confidential communications as either sender or receiver. Subsequent communication between the sender (previously Alice) and the receiver (previously Bob) is as follows. The sender uses the receiver's public asymmetric encryption key to encrypt a session key. The session key is used to encrypt a message which is transmitted to the receiver. The receiver uses his or her own private key to decrypt the session key. The session key is used to decrypt the message.

The above description is included to illustrate the operation of preferred embodiments, and is not meant to limit the scope of the invention. The scope of the invention is to be limited only by the following claims. From the above description, many variations will be apparent to one skilled in the art that would yet be encompassed by the spirit and scope of the present invention.

What is claimed is:

1. At least one non-transitory computer-readable medium containing computer program instructions for performing the steps of:
   a first entity A generates a private key/public key pair to be used by a second entity B in subsequent communications with A, where B has been selected by A to receive confidential communications from A;
   A encrypts said key pair with P, where P is a secret shared by A and B;
   A sends the encrypted key pair to a trusted intermediary L;
   A encrypts a message M, and sends the encrypted M to B over a communications channel;
   B retrieves B's private key/public key pair from L, along with means to decrypt M; and
   B decrypts M using B's private key retrieved from L and said means to decrypt retrieved from L.

2. The at least one non-transitory computer-readable medium of claim 1 wherein the encryption of M comprises A encrypting M and A encrypting A's public key with a randomly generated symmetric key R.

3. The at least one non-transitory computer-readable medium of claim 2 further comprising computer program instructions enabling A to encrypt R with B's public key.

4. Apparatus for facilitating confidential communications between a first entity A and a second entity B, where B has been selected by A to be a recipient of confidential communications from A, said apparatus comprising:
   coupled to A and to B, a shared secret P;
   coupled to A, and accessible to B upon presentation of proper credentials, a trusted intermediary L;

associated with A, means for generating a public/private key pair to be used by B in subsequent confidential communications with A;

coupled to the generating means, means for encrypting the newly generated public/private key pair for B with P;

coupled to the encrypting means, means for transmitting the encrypted public/private key pair to L; and associated with A, means for conveying to B a pointer to L and a randomly generated number Z adapted to enable B to retrieve B's encrypted public/private key pair from L.

5. The apparatus of claim 4 further comprising means within A to encrypt a message destined for B and encrypt a public key of A with a randomly generated symmetric key R.

6. The apparatus of claim 5 further comprising, within A, means for encrypting R with B's newly generated public key.

7. A computer-implemented method for a first entity A to initiate confidential communications with a second entity B that A has selected to be a recipient of said communications, said method comprising the steps of:

A generates a private key/public key pair to be used by B in subsequent communications with A, encrypts said key pair with P, and sends the encrypted key pair to a trusted intermediary L, where P is a secret shared by A and B;

A encrypts a message M, and sends the encrypted M to B over a communications channel;

B retrieves B's private key/public key pair from L, along with means to decrypt M; and B decrypts M using B's private key retrieved from L and said means to decrypt retrieved from L.

8. The method of claim 7 wherein the communications channel comprises an open network.

9. The method of claim 8 wherein the open network comprises the Internet.

10. The method of claim 7 wherein the encryption with P uses symmetric key cryptography.

11. The method of claim 7 wherein the means to decrypt comprises an asymmetric key cryptographic algorithm.

12. The method of claim 7 wherein A's encryption of M comprises A encrypting M and A encrypting A's public key.

13. The method of claim 12 wherein the encryption of M and A's public key comprises encrypting with a randomly generated symmetric key R.

14. The method of claim 13 further comprising the step of A sending to B, over the communications channel, R encrypted with B's public key.

15. The method of claim 14 further comprising the steps of:

B using B's private key to retrieve R; and

B using R to decrypt M and A's public key.

16. The method of claim 7 further comprising the step of A sending to B over the communications channel a pointer to L and a random value Z.

17. The method of claim 16 further comprising the step of B using Z and the pointer to L to retrieve from L B's public private key pair.

18. The method of claim 16 wherein Z is used once and then discarded.

19. The method of claim 7 wherein B does not use B's public key for communicating with any entity other than A.

20. The method of claim 7 wherein M does not contain any non-random padding.

21. The computer-implemented method of claim 7, wherein;

there are N second entities B with whom A wishes to communicate confidentially, where N is an integer greater than or equal to 2; and A sends to the trusted intermediary L a number N of encrypted private key/public key pairs, one pair for each B.

22. The computer-implemented method of claim 7, wherein:

there are a plurality of second entities B with whom A wishes to communicate confidentially;

for each B, A sends a public/private key pair to be used by that B to the trusted intermediary L, along with a unique random value derived from a master random value and from some identifiable information associated with that particular B; and each B derives its unique random value from the master random value and from said identifiable information associated with that particular B.

* * * * *